United States Patent
Talley et al.

(10) Patent No.: US 7,994,374 B2
(45) Date of Patent: Aug. 9, 2011

(54) RECOVERY OF KINETIC HYDRATE INHIBITOR

(75) Inventors: Larry D. Talley, Friendswood, TX (US); Karla S. Colle, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 741 days.

(21) Appl. No.: 11/883,776

(22) PCT Filed: Jan. 17, 2006

(86) PCT No.: PCT/US2006/001496
§ 371 (c)(1),
(2), (4) Date: Aug. 6, 2007

(87) PCT Pub. No.: WO2006/110192
PCT Pub. Date: Oct. 19, 2006

(65) Prior Publication Data
US 2008/0312478 A1    Dec. 18, 2008

Related U.S. Application Data

(60) Provisional application No. 60/669,970, filed on Apr. 7, 2005.

(51) Int. Cl.
*C07C 7/20* (2006.01)
(52) U.S. Cl. .................. 585/15; 95/153; 95/193
(58) Field of Classification Search .......... 585/15
See application file for complete search history.

(56) References Cited

U.S. PATENT DOCUMENTS

| | | | |
|---|---|---|---|
| 2,738,026 A | 3/1956 | Glasgow et al. | |
| 2,758,665 A | 8/1956 | Francis, Jr. | |
| 3,676,981 A | 7/1972 | Afdahl et al. | |
| 4,132,535 A | 1/1979 | Rivers, Jr. et al. | |
| 4,162,145 A | 7/1979 | Alleman | |
| 4,266,958 A | 5/1981 | Cummings | |
| 4,314,891 A | 2/1982 | Knobel | |
| 4,354,553 A | 10/1982 | Hensley | |
| 4,678,558 A | 7/1987 | Belluteau et al. | |
| 5,127,231 A | 7/1992 | Larue et al. | |
| 5,154,857 A | 10/1992 | Durrieu et al. | |
| 5,209,762 A | 5/1993 | Lowell | |
| 5,244,878 A | 9/1993 | Sugier et al. | |
| 5,351,756 A | 10/1994 | Minkkinen et al. | |
| 5,389,208 A | 2/1995 | Beasley et al. | |
| 5,432,292 A | 7/1995 | Sloan, Jr. | |
| 5,441,605 A | 8/1995 | Beasley et al. | |
| 5,600,044 A | 2/1997 | Colle et al. | |

(Continued)

OTHER PUBLICATIONS

K. Van Son and C. Wallace, "Reclamation/Regeneration of Glycols Used for Hydrate Inhibition", 2000, Deep Offshore Technology, 14 pages.

(Continued)

*Primary Examiner* — Ellen M McAvoy

(57) ABSTRACT

A method for treating a fluid having hydrate-forming constituents is provided. In one or more embodiments, the method includes including a mixture (110) comprising glycol and one or more kinetic inhibitors to a fluid (105) that includes one or more hydrate-forming constituents and water to provide a treated fluid comprising the glycol, one or more kinetic inhibitors, one or more hydrate-forming constituents and water. The treated fluid (125) is then separated at conditions sufficient to provide an oil phase stream and an aqueous phase stream, wherein the aqueous phase stream includes one or more kinetic inhibitors, glycol and water.

49 Claims, 1 Drawing Sheet

U.S. PATENT DOCUMENTS

| | | | |
|---|---|---|---|
| 5,741,758 A | 4/1998 | Pakulski | |
| 5,744,665 A | 4/1998 | Costello et al. | |
| H1749 H | 9/1998 | Colle et al. | |
| 5,816,280 A | 10/1998 | Rojey et al. | |
| 5,817,889 A | 10/1998 | Pondebat et al. | |
| 5,841,010 A | 11/1998 | Rabeony et al. | |
| 5,877,361 A | 3/1999 | Rojey et al. | |
| 5,900,516 A | 5/1999 | Talley et al. | |
| 5,936,040 A | 8/1999 | Costello et al. | |
| 5,993,608 A | 11/1999 | Abry et al. | |
| 6,015,929 A | 1/2000 | Rabeony et al. | |
| 6,023,003 A | 2/2000 | Dunning et al. | |
| 6,028,233 A | 2/2000 | Colle et al. | |
| 6,107,531 A | 8/2000 | Colle et al. | |
| 6,152,993 A | 11/2000 | Klomp | |
| 6,177,497 B1 * | 1/2001 | Klug et al. | 524/376 |
| 6,194,622 B1 | 2/2001 | Peiffer et al. | |
| 6,197,095 B1 | 3/2001 | Ditria et al. | |
| 6,214,091 B1 | 4/2001 | Klomp | |
| 6,242,518 B1 | 6/2001 | Bakeev et al. | |
| 6,340,373 B1 | 1/2002 | Billington | |
| 6,417,417 B1 | 7/2002 | Sinquin et al. | |
| 6,451,892 B1 * | 9/2002 | Bakeev et al. | 524/386 |
| 6,508,916 B1 | 1/2003 | Razzaghi et al. | |
| 6,544,932 B2 | 4/2003 | Klug et al. | |
| 7,033,504 B1 * | 4/2006 | Blytas et al. | 210/639 |
| 7,093,655 B2 * | 8/2006 | Atkinson | 166/266 |
| 7,183,240 B2 * | 2/2007 | Dahlmann et al. | 507/240 |
| 7,264,653 B2 * | 9/2007 | Panchalingam et al. | 95/153 |
| 7,323,609 B2 * | 1/2008 | Dahlmann et al. | 585/15 |
| 2004/0211316 A1 | 10/2004 | Collins | |
| 2005/0137432 A1 * | 6/2005 | Matthews et al. | 585/15 |
| 2007/0173672 A1 * | 7/2007 | Dahlmann et al. | 585/15 |

OTHER PUBLICATIONS

European Search Report No. 112695 for 2005UR008, dated Dec. 13, 2005, 3 pages.

* cited by examiner

RECOVERY OF KINETIC HYDRATE INHIBITOR

CROSS REFERENCE TO RELATED APPLICATIONS

This application is the National Stage of International Application No. PCT/US06/01496, file 17 Jan., 2006, which claims the benefit of U.S. Provisional Application No. 60/669,970, file 7 Apr., 2005.

BACKGROUND OF THE INVENTION

1. Field of the Invention

Embodiments of the present invention generally relate to methods of hydrate inhibition. More particularly, embodiments relate to methods of inhibiting hydrate formation using a mixture of kinetic type inhibitors and thermodynamic type inhibitors and the recovery thereof.

2. Description of the Related Art

Hydrates are crystalline solids that can be formed in a fluid whether the fluid is flowing or stationary. Hydrates are most problematic in fluids that are conveyed through pipe. Hydrates have a tendency to adhere to and accumulate along the inner wall of the pipe, thereby partially or completely blocking the flow of fluid through the pipe. Hydrates can also be abrasive and deteriorate the pipe. There is a need, therefore, for improved and cost effective methods for inhibiting hydrate formation.

SUMMARY OF THE INVENTION

A method for treating a fluid having hydrate-forming constituents is provided. In one or more embodiments, the method includes introducing a mixture comprising glycol and one or more kinetic inhibitors to a fluid that includes one or more hydrate-forming constituents and water to provide a treated fluid comprising the glycol, one or more kinetic inhibitors, one or more hydrate-forming constituents and water. The treated fluid is then separated at conditions sufficient to provide an oil phase stream and an aqueous phase stream, wherein the aqueous phase stream includes one or more kinetic inhibitors, glycol and water. The aqueous phase stream is heated at a temperature above the boiling point of the water to provide a first stream comprising water and a second stream comprising the one or more kinetic inhibitors and glycol from the aqueous phase stream.

In one or more embodiments, the method includes introducing a mixture comprising glycol and one or more kinetic inhibitors to the fluid having one or more hydrate-forming constituents and water to provide a treated fluid comprising glycol, one or more kinetic inhibitors, one or more hydrate-forming constituents and water. The treated fluid is separated at conditions sufficient to recover an aqueous phase stream from the treated fluid, the aqueous phase stream comprising one or more kinetic inhibitors, glycol and water. The aqueous phase stream is processed to remove water and a mixture comprising essentially all of the glycol and one or more kinetic inhibitors from the aqueous phase stream is recovered.

In one or more embodiments, the method includes producing a petroleum fluid from one or more wells, the petroleum fluid comprising one or more hydrate-forming constituents, natural gas, oil and water, and transporting the petroleum fluid from the one or more wells. A mixture comprising glycol and one or more kinetic inhibitors is introduced to the petroleum fluid to provide a treated fluid comprising natural gas, oil, water, glycol, one or more hydrate-forming constituents and one or more kinetic inhibitors. The treated fluid is separated into a gas phase stream, an oil phase stream, and an aqueous phase stream, wherein the aqueous phase stream comprises one or more kinetic inhibitors, glycol and water. The gas phase stream is liquefied to form a liquefied natural gas stream. The aqueous phase stream is processed to remove at least a portion of the water; and a mixture comprising essentially all of the glycol and one or more kinetic inhibitors from the aqueous phase stream is recovered.

BRIEF DESCRIPTION OF THE DRAWING

So that the manner in which the above recited features of the present invention can be understood in detail, a more particular description of the invention, briefly summarized above, may be had by reference to embodiments, some of which are illustrated in the appended drawing. It is to be noted, however, that the appended drawing illustrates only typical embodiments of this invention and is therefore not to be considered limiting of its scope, for the invention may admit to other equally effective embodiments.

DETAILED DESCRIPTION

Figure 1:
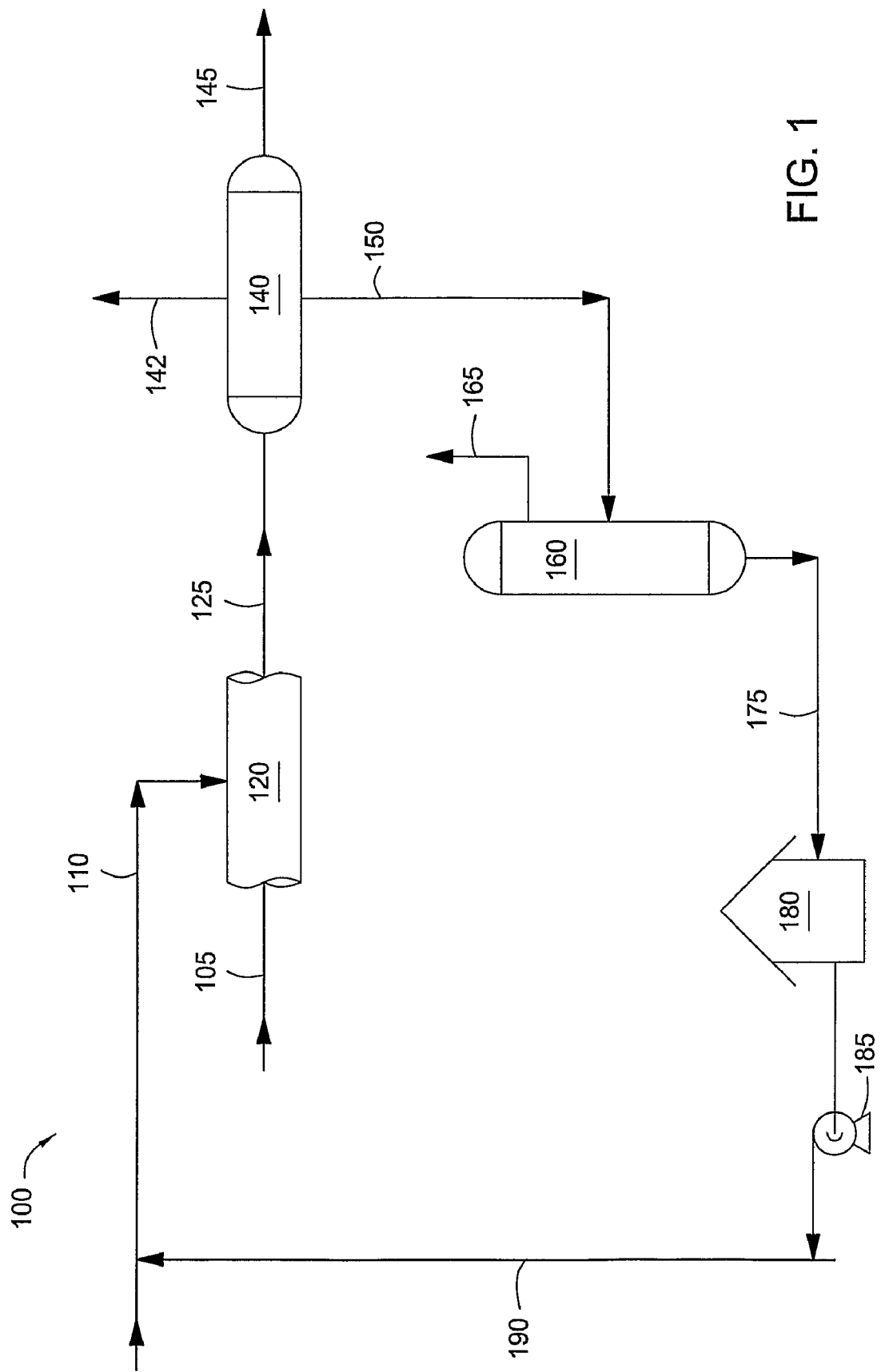
FIG. 1 is a schematic flow diagram of an illustrative method for preventing hydrate formation using a mixture of one or more kinetic and thermodynamic hydrate inhibitors and recovering the mixture according to embodiments described.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

It has been discovered that a hydrate inhibitor mixture of one or more thermodynamic hydrate inhibitors and one or more kinetic hydrate inhibitors dramatically reduces hydrate formation in a fluid, including petroleum fluids at significantly reduced costs. Kinetic hydrate inhibitors slow the rate of hydrate formation relative to uninhibited fluids, whereas thermodynamic hydrate inhibitors reduce the hydrate formation temperature below that of untreated fluids. Consequently, the synergistic effects of the thermodynamic hydrate inhibitors and kinetic hydrate inhibitors are additive and therefore, significantly reduce hydrate formation in a fluid.

In one or more embodiments, the one or more kinetic hydrate inhibitors can be added to existing hydrate inhibitor systems without any capital expenditure or changes to existing inhibitor regeneration systems. The addition of kinetic hydrate inhibitors to existing thermodynamic hydrate inhibitors only slightly increases the volume of the existing inhibitor inventory because kinetic hydrate inhibitors are low dose inhibitors that provide a substantial amount of subcooling. In other words, the volumetric throughput of an existing thermodynamic hydrate inhibitor regeneration facility is essentially the same with or without the addition of kinetic hydrate inhibitors. However, fluid capacity to be treated (i.e. the amount of water to be inhibited) can be significantly increased without increasing capacity of an existing thermodynamic hydrate regeneration unit.

Most significantly, the one or more kinetic inhibitors can be added directly, without modification, to an existing thermodynamic hydrate inhibitor system and the mixture of the kinetic and thermodynamic inhibitors can be recovered and recycled at a surprisingly high efficiency. This is extremely valuable to operators that want to increase the number of producing wells in a field inhibited by thermodynamic inhibitors, and/or places where wells have increasing water production rates that will exceed the current thermodynamic inhibitors regeneration capacity.

FIG. 1 is a schematic flow diagram of an illustrative method 100 for preventing hydrate formation in a petroleum fluid using a mixture of one or more kinetic hydrate inhibitors and thermodynamic hydrate inhibitors. A petroleum fluid stream 105 having one or more hydrate-forming constituents and water is mixed or otherwise contacted with a hydrate inhibitor mixture stream 110. The hydrate inhibitor mixture includes one or more thermodynamic hydrate inhibitors and one or more kinetic hydrate inhibitors. In one or more embodiments, of from about 0.1 grams to about 1.0 grams of the one or more kinetic hydrate inhibitors is added per 100 grams of water in the petroleum stream 105. In one or more embodiments, at least 5 grams of the one or more thermodynamic hydrate inhibitors are added per 100 grams of water in the petroleum stream 105.

The term "hydrate-forming constituent" refers to a compound or molecule in petroleum fluids, including natural gas, that forms hydrates at elevated pressures and/or reduced temperatures. A "hydrate" is a crystalline solid which looks like ice, and forms when water molecules form a cage-like structure around a "hydrate-forming constituent." Illustrative hydrate-forming constituents include, but are not limited to, hydrocarbons such as methane, ethane, propane, isobutane, butane, neopentane, ethylene, propylene, isobutylene, cyclopropane, cyclobutane, cyclopentane, cyclohexane, and benzene. Hydrate-forming constituents can also include non-hydrocarbons, such as oxygen, nitrogen, hydrogen sulfide, carbon dioxide, sulfur dioxide, and chlorine, for example.

The term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state.

The term "thermodynamic hydrate inhibitor" refers to a molecule and/or compound, or mixture of molecules and/or compounds capable of reducing the hydrate formation temperature in a petroleum fluid that is either liquid or gas phase. For example, the minimum effective operating temperature of a petroleum fluid can be reduced by at least 1.5° C., or 3° C., or 6° C., or 12° C., or 25° C. due to the addition of one or more thermodynamic hydrate inhibitors. In one or more embodiments, the minimum effective operating temperature of a petroleum fluid can be reduced by about 0.5° C. to about 30° C., or about 0.5° C. to about 22° C., or about 0.5° C. to about 17° C.

The term "kinetic hydrate inhibitor" refers to a molecule and/or compound or mixture of molecules and/or compounds capable of decreasing the rate of hydrate formation in a petroleum fluid that is either liquid or gas phase. A kinetic hydrate inhibitor can be a solid or liquid at room temperature and/or operating conditions. The hydrate formation rate can be reduced sufficiently by a kinetic hydrate inhibitor such that no hydrates form during the time fluids are resident in a pipeline at temperatures below the hydrate formation temperature. For example, the minimum effective operating temperature of a petroleum fluid can be reduced by at least 1.5° C., or 3° C., or 6° C., or 12° C., or 25° C. due to the addition of one or more kinetic hydrate inhibitors. In one or more embodiments, the minimum effective operating temperature of a petroleum fluid can be reduced by about 0.5° C. to about 30° C., or about 0.5° C. to about 22° C., or about 0.5° C. to about 17° C.

The term "minimum effective operating temperature" refers to the temperature above which hydrates do not form in fluids containing hydrate forming constituents during the time the fluids are resident in a pipeline. For thermodynamic inhibition only, the minimum effective operating temperature is equal to the thermodynamically inhibited hydrate formation temperature. For kinetic hydrate inhibitors, the minimum effective operating temperature is lower than the thermodynamically inhibited hydrate formation temperature. For the combination of thermodynamic and kinetic inhibition, the minimum effective operating temperature is even lower than the thermodynamically inhibited hydrate formation temperature.

Preferably, the hydrate inhibitor mixture stream 110 is mixed with the petroleum fluid stream 105 as the petroleum fluid stream 105 flows through a conduit 120 such as a pipeline as shown in FIG. 1. Although not shown, the hydrate inhibitor mixture stream 110 can be mixed with the petroleum fluid stream 105 in a batch mode, such as in a conventional storage tank, mixer container, or floating storage vessel, for example. The petroleum fluid stream 105 can originate from one or more hydrocarbon production wells either on-shore or off-shore or both. As such, the petroleum fluid stream 105 can be one or any combination of streams containing natural gas, gas condensate, volatile oil, and/or water.

Depending on the source or sources of the petroleum fluid stream 105, the petroleum fluid stream 105 can have varying amounts of water. For example, the petroleum fluid stream 105 can have 0.1% by volume of water or more, 5% by volume of water or more or 90% by volume of water or more. In one or more embodiments, the fluid stream 105 can have of from 0.1% by volume of water to about 98% by volume of water. In one or more embodiments, the petroleum fluid stream 105 can have of from 5% by volume of water to about 70% by volume of water. In one or more embodiments, the petroleum fluid stream 105 can have of from 10% by volume of water to about 50% by volume of water. The petroleum fluid stream 105 can further include varying concentrations of salt.

The petroleum fluid stream 105 can also include varying amounts of one or more hydrate-forming constituents including, but not limited to, methane, ethane, propane, isobutane, butane, neopentane, ethylene, propylene, isobutylene, cyclopropane, cyclobutane, cyclopentane, cyclohexane, benzene, nitrogen, hydrogen sulfide, and carbon dioxide. In one or more embodiments, the petroleum fluid stream 105 includes about 1% by weight (wt %) or more, 50 wt % by or more, or 98 wt % or more of the one or more hydrate-forming constituents. In one or more embodiments, the petroleum fluid stream 105 can have of from 1 wt % to about 98 wt % of the one or more hydrate-forming constituents. In one or more embodiments, the petroleum fluid stream 105 can have of from 10 wt % to about 50 wt % of the one or more hydrate-forming constituents.

Any kinetic hydrate inhibitor capable of decreasing the rate of hydrate formation and having a boiling point greater than water can be used. Suitable kinetic hydrate inhibitors should have a boiling point at operating pressures greater than water in the petroleum stream 105 so that the kinetic hydrate inhibitors are not flashed with water. Preferably, the one or more kinetic hydrate inhibitors are water soluble polymers. Preferred water soluble polymers are not soluble in either a gas stream or a hydrocarbon liquid stream. Suitable water soluble polymers include, but are not limited to polymers and copolymers of acrylamides, maleimides and mixtures thereof. Some illustrative kinetic hydrate inhibitors include, but are not limited to, poly(vinylpyrrolidone) (PVP); poly(vinylcaprolactam) (PVCap); copolymers of vinylpyrrolidone and vinylcaprolactam; poly(N-methyl-N-vinylacetamide); copolymers of N-methyl-N-vinylacetamide and isopropylmethacrylamide; copolymers of N-methyl-N-vinylacetamide and acryloylpiperidine; copolymers of N-methyl-N-vinylacetamide and methacryloylpyrrolidine; copolymers of N-methyl-N-vinylacetamide and acryloylpyrrolidine; derivatives thereof; and mixtures thereof. Other illustrative kinetic hydrate inhibitors include, but are not limited to, acrylamide/maleimide copolymers such as dimethylacrylamide (DMAM) copolymerized with maleimide (ME), ethylmaleimide (EME), propylmaleimide (PME), and butylmaleimide (BME), for example. Still other illustrative kinetic hydrate inhibitors include, but are not limited to, acrylamide/maleimide copolymers such as DMAM/methylmaleimide (DMAM/MME), and DMAM/cyclohexylmaleimide (DMAM/CHME), N-vinyl amide/maleimide copolymers, such as N-methyl-N-vinylacetamide/ethylmaleimide (VIMA/EME), and lactam/maleimide copolymers, such as vinylcaprolactam/ethylmaleimide (VCap/EME), for example. Preferably, the kinetic hydrate inhibitor includes poly (vinylcaprolactam). Additional illustrative polymers and copolymers are described in U.S. Pat. Nos. 5,936,040; 6,015,929; 6,028,233; 6,107,531; and 6,194, 622.

Preferably, the one or more kinetic hydrate inhibitors are soluble in the one or more thermodynamic hydrate inhibitors. In one or more embodiments, the one or more thermodynamic hydrate inhibitors serve as a solvent for the kinetic hydrate inhibitors which are solids at room temperature. Accordingly, any thermodynamic hydrate inhibitor suitable for dissolving and delivering the inhibitor to the aqueous phase of the petroleum fluid can be used. Illustrative thermodynamic hydrate inhibitors include, but are not limited to brine, sea water, produced brine, methanol, ethanol, propanol, isopropanol, glycol, aqueous solutions thereof or mixtures thereof. Preferably, the thermodynamic hydrate inhibitor includes one or more glycols, such as monoethylene glycol (MEG), for example. In one or more embodiments, the thermodynamic hydrate inhibitor includes methanol. In one or more embodiments, the thermodynamic hydrate inhibitor includes a mixture of MEG and methanol.

In one or more embodiments, the inhibitor mixture 110 can include of from about 5% by volume to about 99% by volume of the one or more thermodynamic inhibitors and of from about 0.1% by volume to about 50% by volume of the one or more kinetic inhibitors. The balance of the mixture 110 can be water. In one or more embodiments, the inhibitor mixture 110 includes of from about 20% by volume to about 99% by volume of the one or more thermodynamic inhibitors and of from about 0.5% by volume to about 20% by volume or more of the one or more kinetic inhibitors. Preferably, the inhibitor mixture 110 contains less than about 5% by volume, less than 4% by volume, less than 3% by volume, less than 2% by volume, or less than 1.5% by volume of the one or more kinetic inhibitors. Preferably, the hydrate inhibitor mixture 110 contains less than 50% by volume of water, such as less than 40% by volume, less than 30% by volume or less than 20% by volume of water.

In one or more embodiments, the hydrate inhibitor mixture 110 is added to the petroleum fluid stream 105 in an appropriate amount such that the treated fluid has less than or equal to a 1:1 ratio of glycol to water. In one or more embodiments, the ratio of glycol to water in the treated stream 125 is less than 0.8:1. In one or more embodiments, the ratio of glycol to water in the treated stream 125 is less than 0.7:1. In one or more embodiments, the ratio of glycol to water in the treated stream 125 is less than 0.5:1.

Still referring to FIG. 1, the combination of the hydrate inhibitor mixture stream 110 and the petroleum fluid stream 105 provides a treated stream 125 in which hydrate formation is inhibited or at least substantially inhibited. The treated stream 125 includes the petroleum fluid, hydrate-forming constituents, hydrate inhibitors, and water from the hydrate inhibitor mixture stream 110 and the petroleum fluid stream 105. The minimum effective operating temperature of the treated stream 125 is also lowered. In one or more embodiments, the minimum effective operating temperature of the treated stream 125 is lowered by at least 1.5° C., or 3° C., or 6° C., or 12° C., or 25° C. In one or more embodiments, the minimum effective operating temperature of the treated stream 125 is lowered by about 0.5° C. to about 30° C., or about 0.5° C. to about 22° C., or about 0.5° C. to about 17° C.

The treated stream 125 can be separated using a separator 140, such as a horizontal pressure vessel for example. The treated stream 125 can be separated into at least an oil phase and an aqueous phase where any gas is most likely mixed with the oil phase. The gas can then be separated from the oil phase using any technique for gas separation.

The treated stream 125 is preferably separated at conditions sufficient to provide a gas phase stream 142, an oil phase stream 145 ("first liquid phase stream"), and an aqueous phase stream 150 ("second liquid phase stream"). For example, the treated stream 125 can be separated at a temperature of about 40° C. or more and a pressure of about 60 bar or more. Preferably, the treated stream 125 is separated at conditions sufficient to provide an aqueous phase stream 150 that contains a substantial portion of the water and hydrate inhibitors from the treated stream 125. In one or more embodiments, up to 99.9% by volume of the water and hydrate inhibitors are removed from the treated stream 125 and isolated in the aqueous phase stream 150. A small portion of the water and hydrate inhibitors can be entrained in the gas phase stream 142 and/or oil phase stream 145.

The gas phase stream 142 and the oil phase stream 145 can then be processed as needed for consumption or sale. Depending on the source or sources of the petroleum fluid stream 105, the gas phase stream 142 can include methane, ethane, propane, butanes, pentanes, hexanes, cyclohexanes, hydrogen sulfide, carbon dioxide, nitrogen and water. Likewise, the oil phase stream 145 can include some of the gas phase components, as well as heavier hydrocarbons, such as paraffins, aromatics, resins and asphaltenes, for example.

In one or more embodiments, a portion of the gas phase stream 142 can be consumed or sold for consumption and a remaining portion of the gas phase stream 142 can be reinjected into a subterranean reservoir. For example, the gas phase stream 142 can be split into a first stream for sale and/or consumption and a second phase stream for reinjection. The first stream for sale and/or consumption can be processed or treated to remove acid gas, including any sulfur-containing compounds and/or carbon dioxide, to make the stream suitable for use. In one or more embodiments, the first stream can be processed using a cryogenic distillation process, such as one having a controlled freeze zone as shown and described in U.S. Pat. No. 4,533,372, to produce a product stream meeting environmental specifications for consumption and a waste stream containing the removed acid gas. The second stream can be bypassed around the processing unit and combined with the waste stream from the processing unit to form a combined acid gas stream for reinjection.

The aqueous phase stream 150 can be separated to remove the captured water from the hydrate inhibitor mixture. For example, the aqueous phase stream 150 can be separated using a column or tower 160 to remove the water as an overhead stream 165 or "first stream." The hydrate inhibitor mixture can then be recovered from the column 160 as a bottoms stream 175 or "second stream," which can be stored for later use in any conventional storage container 180. In one or more embodiments, the recovered hydrate inhibitor mixture 175 can be returned to the pipeline 120 via a recycle stream 190. The recycle stream 190 can be boosted in pressure using a pump 185 to meet the hydraulic demand of the pipeline 120. Any conventional pump, such as a rotating or centrifugal pump for example, can be used.

In one or more embodiments, the aqueous phase stream 150 is flashed at a temperature above the boiling point of water to drive the water from the hydrate inhibitor mixture. For example, the aqueous phase stream 150 can be flashed at a temperature above 100° C., such as about 120° C. or more, about 130° C. or more, or about 140° C. or more, or about 150° C. or more. In one or more embodiments, the aqueous phase stream 150 is flashed at a temperature of from about 100° C. to about 175° C.

The operating pressure of the column 160 can range from a low of about 0.5 bar to a high of about 200 bar. Preferably, the operating pressure of the column 160 is above atmospheric pressure. For example, the operating pressure of the column 160 can be of from about 1 bar to about 150 bar. In one or more embodiments, the operating pressure of the column 160 can be of from about 1 bar to about 50 bar. In one or more embodiments, the operating pressure of the column 160 can range from a low of about 1 bar, 2 bar, or 3 bar to a high of about 3 bar, 10 bar, or 15 bar.

The overhead stream ("first stream") 165 from the column 160 can include of from 0 wt % to about 0.1 wt % of hydrate inhibitors, of from 99 wt % to about 100 wt % of water, and of from 0 wt % to about 1 wt % of hydrate-forming constituents. The overhead stream ("first stream") 165 from the column 160 can include of from 0 wt % to about 0.1 wt % of the kinetic hydrate inhibitors from the aqueous phase stream 150, of from 0 wt % to about 1 wt % of the thermodynamic hydrate inhibitors from the aqueous phase stream 150, of from 20 wt % to about 100 wt % of the water from the aqueous phase stream 150, and of from 20 wt % to about 100 wt % of the hydrate-forming constituents from the aqueous phase stream 150. The overhead stream 165 consisting primarily of the flashed water can be disposed or recycled for additional use.

The bottoms stream ("second stream") 175 from the column 160 can be passed to a storage container 180. In one or more embodiments, the second stream 175 can include of from 0.1 wt % to about 50 wt % of kinetic hydrate inhibitors, of from 5 wt % to about 99 wt % of thermodynamic hydrate inhibitors, of from 0 wt % to about 50 wt % of water, and of from 0 wt % to about 0.1 wt % ("trace amount") of hydrate-forming constituents. In one or more embodiments, the second stream 175 can include of from 0.5 wt % to about 20 wt % of kinetic hydrate inhibitors, of from 20 wt % to about 99 wt % of thermodynamic hydrate inhibitors, of from 0 wt % to about 30 wt % of water, and less than about 0.1 wt % ("trace amount") of hydrate-forming constituents.

As mentioned above, the petroleum fluid 105 to be treated can contain various amounts of salt. Such salt can accumulate in the column 160 or in the recycle stream 190 depending on the operating conditions of the column 160, if not removed or otherwise treated. A suitable technique for treating salt is described in U.S. Pat. No. 6,340,373.

Surprisingly, the majority of the hydrate inhibitor mixture added to the petroleum fluid stream 105 is captured in the bottoms stream 175. In other words, losses are minimal and the recovery efficiency of the hydrate inhibitor mixture is extremely high. For example, the liquid bottoms stream 175 contains at least 99% by volume of the hydrate inhibitor mixture added to the petroleum fluid stream 105. In one or more embodiments, as much as 99.95% by volume of the hydrate inhibitor mixture added to the petroleum fluid stream 105 is recovered in the bottoms stream 175. The recovery efficiency of the kinetic hydrate inhibitors is especially important because of the high cost of this raw material which can be orders of magnitude more than the glycol.

Additionally, the ratio of the one or more kinetic hydrate inhibitors to the glycol can remain constant throughout the recovery system. Provided the water in the aqueous phase stream 150 has a boiling point less than the one or more kinetic hydrate inhibitors and glycol, only the water will be removed in the overhead stream 165 from the column 160. The column 160 can be operated with such a large operating window that no entrainment losses are incurred. Accordingly, 100% of the one or more kinetic hydrate inhibitors and glycol from the aqueous phase stream 150 can be recovered in the bottoms stream 175 from the column 160. The only losses of the kinetic hydrate inhibitors and glycol can occur in the separator 140. And then, only trace amounts (i.e. less than 0.1 wt %) of kinetic hydrate inhibitors and/or glycol are lost due to entrainment in the gas phase stream 142 or oil phase stream 145.

Referring again to FIG. 1, the recovered hydrate inhibitor mixture can be stored in container 180 for later use. Additional or fresh inhibitors can be added to the storage container 180 if required (not shown in FIG. 1) to meet changing process conditions or specifications. For example, the any one or more of the inhibitors can be added or replenished based on the composition of the petroleum fluid stream 105, weather conditions, specification requirements, regulations, any combination thereof. When needed, a recycle stream 190 containing the hydrate inhibitor mixture from the container 180 can be transferred via the pump 185 to the conduit 120 with the entering petroleum fluid stream 105, as shown in FIG. 1.

Various terms have been defined above. To the extent a term used in a claim is not defined above, it should be given the broadest definition persons in the pertinent art have given that term as reflected in at least one printed publication or issued patent. Certain embodiments and features have also been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for treating a fluid having hydrate-forming constituents, comprising:
   introducing a mixture comprising glycol and one or more kinetic inhibitors to a fluid that includes one or more hydrate-forming constituents and water to provide a treated fluid comprising the glycol, one or more kinetic inhibitors, one or more hydrate-forming constituents and water;
   in an aqueous phase separating step, separating the treated fluid at conditions sufficient to provide an oil phase stream and an aqueous phase stream, wherein the aqueous phase stream includes one or more kinetic inhibitors, glycol and water; and
   in a kinetic inhibitor recovery step, heating the aqueous phase stream at a temperature of above 100° C. to provide a first stream comprising water and a second stream comprising the one or more kinetic inhibitors and glycol from the aqueous phase stream.

2. The method of claim 1, further comprising re-using the second stream comprising one or more kinetic inhibitors and glycol.

3. The method of claim 1, wherein introducing a mixture comprises adding the mixture to a pipeline containing the fluid.

4. The method of claim 1, wherein the hydrate-forming constituent comprises one or more hydrocarbons selected from the group consisting of methane, ethane, propane, isobutane, butane, neopentane, ethylene, propylene, isobutylene, cyclopropane, cyclobutane, cyclopentane, cyclohexane, and benzene.

5. The method of claim 1, wherein the hydrate-forming constituent comprises one or more non-hydrocarbons selected from the group consisting of nitrogen, hydrogen sulfide, and carbon dioxide.

6. The method of claim 1, wherein the mixture comprises less than 5 wt% of the one or more kinetic inhibitors.

7. The method of claim 1, wherein the treated fluid comprises less than or equal to a 1:1 ratio of glycol to water.

8. The method of claim 1, wherein the second stream comprising one or more kinetic inhibitors and glycol comprises less than 1 wt% of the hydrate-forming constituents.

9. The method of claim 1, wherein the aqueous phase stream is heated above 100° C.

10. The method of claim 1, wherein the mixture further comprises brine, sea water, produced brine, methanol, ethanol, propanol, isopropanol, glycol, aqueous solutions thereof or mixtures thereof.

11. The method of claim 1, wherein the glycol comprises monoethylene glycol or polyethylene glycol.

12. The method of claim 1, wherein the mixture comprises monoethylene glycol and methanol.

13. The method of claim 1, wherein the one or more kinetic inhibitors are selected from the group consisting of poly (vinylpyrrolidone); poly(vinylcaprolactam); polyacrylamides; copolymers of vinylpyrrolidone, vinylcaprolactam, and/or acrylamides, poly(N-methyl-N-vinylacetamide); copolymers of N-methyl-N-vinylacetamide and iso-propylmethacrylamide; copolymers of N-methyl-N-vinylacetamide and acryloylpiperidine; copolymers of N-methyl-N-vinylacetamide and methacryloylpyrrolidine, and copolymers of N-methyl-N-vinylacetamide and acryloylpyrrolidine; derivatives thereof; and mixtures thereof.

14. The method of claim 1, wherein the one or more kinetic inhibitors comprises poly (vinylcaprolactam).

15. The method of claim 1, wherein the fluid comprises natural gas.

16. The method of claim 1, wherein the fluid that includes one or more hydrate-forming constituents and water is contained in a floating storage vessel.

17. The method of claim 1, wherein the fluid that includes one or more hydrate-forming constituents and water is contained in a floating storage vessel and at least a portion of the mixture comprising glycol and one or more kinetic inhibitors is introduced to the fluid while in the floating storage vessel.

18. A method for treating a fluid having hydrate-forming constituents, comprising:
   introducing a mixture comprising glycol and one or more kinetic inhibitors to the fluid having one or more hydrate-forming constituents and water to provide a treated fluid comprising glycol, one or more kinetic inhibitors, one or more hydrate-forming constituents and water;
   in an aqueous phase separating step, separating the treated fluid at conditions sufficient to recover an aqueous phase stream from the treated fluid, the aqueous phase stream comprising one or more kinetic inhibitors, glycol and water;
   in a kinetic inhibitor recovery step, heating the aqueous phase stream to above 100° C. to remove water and one or more hydrate-forming constituents; and
   recovering a mixture comprising essentially all of the glycol and one or more kinetic inhibitors from the aqueous phase stream.

19. The method of claim 18, wherein introducing a mixture comprises adding the mixture to a pipeline containing the fluid.

20. The method of claim 18, wherein the hydrate-forming constituent comprises one or more hydrocarbons selected from the group consisting of methane, ethane, propane, isobutane, butane, neopentane, ethylene, propylene, isobutylene, cyclopropane, cyclobutane, cyclopentane, cyclohexane, and benzene.

21. The method of claim 18, wherein the hydrate-forming constituent comprises one or more non-hydrocarbons selected from the group consisting of nitrogen, hydrogen sulfide, and carbon dioxide.

22. The method of claim 18, wherein the mixture comprises less than 30 wt% of the one or more kinetic inhibitors.

23. The method of claim 18, wherein the treated fluid comprises less than or equal to a 1:1 ratio of glycol to water.

24. The method of claim 18, wherein the mixture further comprises brine, sea water, produced brine, methanol, ethanol, propanol, isopropanol, glycol, aqueous solutions thereof or mixtures thereof.

25. The method of claim 18, wherein the glycol comprises monoethylene glycol or polyethylene glycol.

26. The method of claim 18, wherein the mixture comprises monoethylene glycol and methanol.

27. The method of claim 18, wherein the one or more kinetic inhibitors are selected from the group consisting of poly(vinylpyrrolidone); poly(vinylcaprolactam), polyacrylamides; copolymers of vinylpyrrolidone, vinylcaprolactam; and/or acrylamides, poly(N-methyl-N-vinylacetamide); copolymers of N-methyl-N-vinylacetamide and iso-propylmethacrylamide; copolymers of N-methyl-N-vinylacetamide and acryloylpiperidine; copolymers of N-methyl-N-vinylacetamide and methacryloylpyrrolidine, and copolymers of N-methyl-N-vinylacetamide and acryloylpyrrolidine; derivatives thereof; and mixtures thereof.

28. The method of claim 18, wherein the one or more kinetic inhibitors comprises poly(vinylcaprolactam).

29. The method of claim 18, wherein the fluid comprises natural gas.

30. The method of claim 18, wherein the fluid that includes one or more hydrate-forming constituents and water is contained in a floating storage vessel.

31. The method of claim 18, wherein the fluid that includes one or more hydrate-forming constituents and water is contained in a floating storage vessel and at least a portion of the mixture comprising glycol and one or more kinetic inhibitors is introduced to the petroleum fluid while in the floating storage vessel.

32. A method for treating a fluid having hydrate-forming constituents, comprising:
    producing a petroleum fluid from one or more wells, the petroleum fluid comprising one or more hydrate-forming constituents, natural gas, oil and water;
    transporting the petroleum fluid from the one or more wells;
    introducing a mixture comprising glycol and one or more kinetic inhibitors to the petroleum fluid to provide a treated fluid comprising natural gas, oil, water, glycol, one or more hydrate-forming constituents and one or more kinetic inhibitors;
    in an aqueous phase separating step, separating the treated fluid into a gas phase stream, an oil phase stream, and an aqueous phase stream, wherein the aqueous phase stream comprises one or more kinetic inhibitors, one or more hydrate-forming constituents, glycol and water;
    liquefying the gas phase stream to form a liquefied natural gas stream;
    in a kinetic inhibitor recovery step, heating the aqueous phase stream to above 100° C. to remove at least a portion of the water; and
    recovering a mixture comprising essentially all of the glycol and one or more kinetic inhibitors from the aqueous phase stream.

33. The method of claim 32, further comprising transporting the liquefied natural gas stream from a first location to a second location.

34. The method of claim 32, further comprising regasifying the liquefied natural gas stream to a gaseous state.

35. The method of claim 32, further comprising re-using the liquid phase stream comprising the one or more kinetic inhibitors and glycol.

36. The method of claim 32, wherein introducing a mixture comprises adding the mixture to a pipeline containing the fluid.

37. The method of claim 32, wherein the hydrate-forming constituent comprises one or more hydrocarbons selected from the group consisting of methane, ethane, propane, isobutane, butane, neopentane, ethylene, propylene, isobutylene, cyclopropane, cyclobutane, cyclopentane, cyclohexane, and benzene.

38. The method of claim 32, wherein the hydrate-forming constituent comprises one or more non-hydrocarbons selected from the group consisting of nitrogen, hydrogen sulfide, and carbon dioxide.

39. The method of claim 32, wherein the mixture comprises less than 50 wt% of the one or more kinetic inhibitors.

40. The method of claim 32, wherein the treated fluid comprises less than or equal to a 1:1 ratio of glycol to water.

41. The method of claim 32, wherein the liquid phase stream comprising the one or more kinetic inhibitors and glycol comprises less than 2% by volume of the hydrate-forming constituents.

42. The method of claim 32, wherein the mixture further comprises brine, sea water, produced brine, methanol, ethanol, propanol, isopropanol, glycol, aqueous solutions thereof, or mixtures thereof.

43. The method of claim 32, wherein the glycol comprises monoethylene glycol or polyethylene glycol.

44. The method of claim 32, wherein the mixture comprises monoethylene glycol and methanol.

45. The method of claim 32, wherein the one or more kinetic inhibitors are selected from the group consisting of poly(vinylpyrrolidone); poly(vinylcaprolactam); polyacrylamides; copolymers of vinylpyrrolidone; vinylcaprolactam; and/or acrylamides; poly(N-methyl-N-vinylacetamide); copolymers of N-methyl-N-vinylacetamide and iso-propylmethacrylamide; copolymers of N-methyl-N-vinylacetamide and acryloylpiperidine; copolymers of N-methyl-N-vinylacetamide and methacryloylpyrrolidine; copolymers of N-methyl-N-vinylacetamide and acryloylpyrrolidine; derivatives thereof; and mixtures thereof.

46. The method of claim 32, wherein the one or more kinetic inhibitors comprises poly(vinylcaprolactam).

47. The method of claim 32, wherein the fluid comprises natural gas.

48. The method of claim 32, wherein the petroleum fluid from the one or more wells is transported to a floating storage vessel.

49. The method of claim 32, wherein the petroleum fluid from the one or more wells is transported to a floating storage vessel and at least a portion of the mixture comprising glycol and one or more kinetic inhibitors is introduced to the petroleum fluid while in the floating storage vessel.

* * * * *